United States Patent [19]

Bourbeau

[11] 3,852,656
[45] Dec. 3, 1974

[54] INVERTER FAULT PROTECTION AND FREQUENCY LIMITING CIRCUIT

[75] Inventor: Frank J. Bourbeau, Santa Barbara, Calif.

[73] Assignee: General Motors Corporation, Detroit, Mich.

[22] Filed: Apr. 19, 1974

[21] Appl. No.: 462,363

[52] U.S. Cl. .................................. 321/11, 321/13
[51] Int. Cl. ............................................ H02m 1/08
[58] Field of Search ............................ 321/11-14, 321/18

[56] References Cited
UNITED STATES PATENTS

| 3,458,797 | 7/1969 | Larsen | 321/18 X |
|---|---|---|---|
| 3,686,558 | 8/1972 | Havas et al. | 321/11 X |

Primary Examiner—R. N. Envall, Jr.
Attorney, Agent, or Firm—H. N. Conkey

[57] ABSTRACT

An inverter fault protection and frequency limiting circuit for inverters having controlled rectifier and antiparallel diode pairs is described for preventing short circuits of the inverter power supply and for limiting the operating frequency of the inverter. An inhibit circuit is responsive to controlled rectifier forward blocking voltages and antiparallel diode currents to generate a gate inhibit signal for one of the series-coupled controlled rectifiers when the other one of the controlled rectifiers is not forward blocking or if the time duration of the current through the antiparallel diode thereof is less than a specified controlled rectifier turn-off time. A frequency limiting circuit is responsive to the gate inhibit signal for limiting the maximum operating frequency of the inverter.

3 Claims, 6 Drawing Figures

Fig. 6

INVERTER FAULT PROTECTION AND FREQUENCY LIMITING CIRCUIT

This invention relates to an inverter fault protection and frequency limiting circuit. More specifically, this invention relates to a protection circuit for inverters containing controlled rectifier and antiparallel diode pairs and a frequency limiting circuit therefor.

A known type of DC to AC inverter includes a pair of controlled rectifiers series-coupled across a DC supply, each controlled rectifier having an antiparallel diode coupled therewith. In operation, one of the controlled rectifiers is gated conductive and thereafter is commutated off when current is returned to the power supply through its antiparallel diode. Following commutation of one of the controlled rectifiers, the other one is gated conductive and thereafter commutated off. While current is flowing through the antiparallel diode, turn-off time is presented to its respective controlled rectifier.

In the aforementioned type of inverter, a short circuit occurs across the DC supply when one of the controlled rectifiers is gated conductive while the other controlled rectifier series-coupled therewith is conducting. To insure that such a fault cannot occur, it has been suggested to monitor the voltage across the controlled rectifiers and inhibit the gating of one of the controlled rectifiers when the voltage across the other one of the controlled rectifiers represents that it is conducting. Although this form of protection circuit would suffice for low operating frequencies of the inverter, at higher operating frequencies, it is often necessary to gate one of the controlled rectifiers conductive while current is flowing through the antiparallel diode associated with the other one of the controlled rectifiers and before a forward blocking voltage can be detected. At these operating frequencies, simply monitoring the blocking voltage to prevent short circuit of the DC power supply would be insufficient. It is therefore a general object of this invention to provide an improved inverter fault protection circuit.

It is another object of this invention to provide for an inverter fault protection circuit for preventing short circuits of the inverter power supply for both low and high operating frequencies thereof.

It is another object of this invention to provide for an inverter fault protection circuit for inverters having thyristor and antiparallel diode pairs to inhibit the gating conductive of one of the controlled rectifiers if another one of the controlled rectifiers is not forward blocking or if the duration of the current pulse through the antiparallel diode of the other one of the controlled rectifiers does not exceed a specified controlled rectifier turn-off time.

It is another object of this invention to provide for an inverter fault protection and frequency limiting circuit for inverters having controlled rectifier and antiparallel diode pairs to generate an inhibit signal to prevent the gating conductive of one controlled rectifier when the other controlled rectifier is not forward blocking or if the duration of the current pulse through its antiparallel diode does not exceed a specified controlled rectifier turn-off time and for limiting the frequency of the inverter in response to the generation of inhibit signals.

These and other objects of this invention may be best understood by reference to the following description of a preferred embodiment and the drawings, in which:

Figure 1:
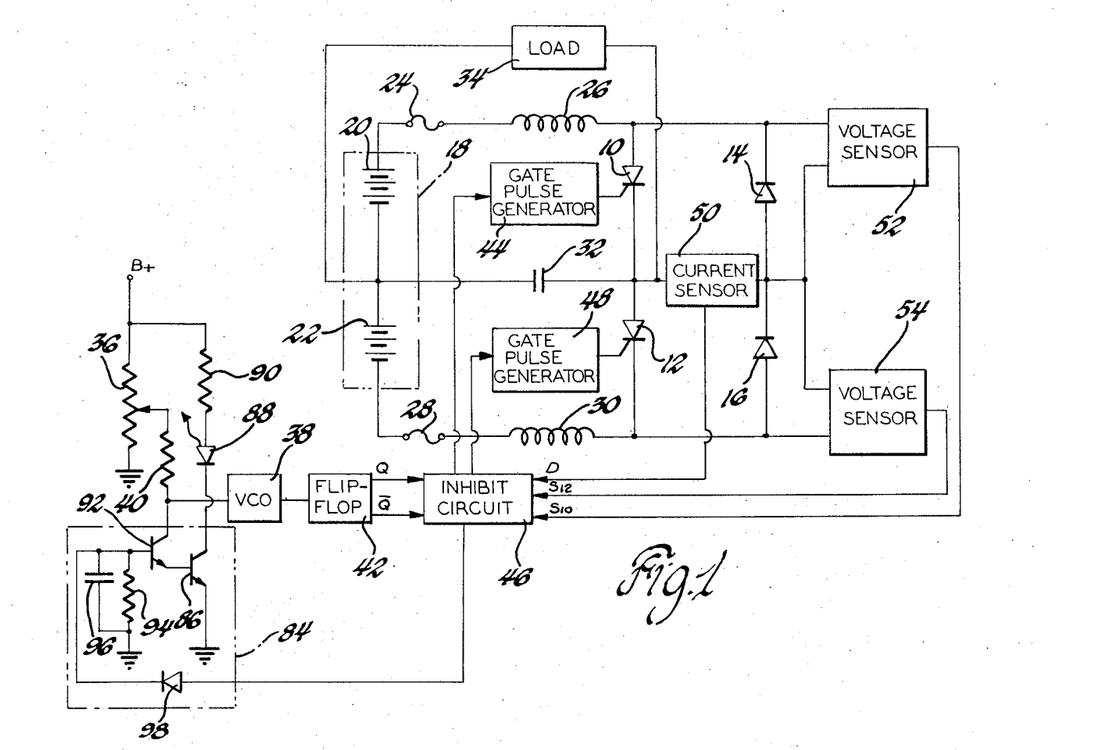
FIG. 1 is a circuit diagram of an inverter incorporating the fault protection and frequency limiting circuit of this invention.

Referring to FIG. 1, there is illustrated a conventional sine wave inverter including a pair of series-coupled controlled rectifiers 10 and 12. The controlled rectifier 10 has coupled therewith an antiparallel diode 14 and the controlled rectifier 12 has coupled therewith an antiparallel diode 16. A DC power supply 18 includes a pair of series-coupled DC voltage sources 20 and 22, the positive terminal of the voltage source 20 being coupled to the anode of the controlled rectifier 10 through a fuse 24 and an inductor 26 and the negative terminal of the voltage source 22 being coupled to the cathode of the controlled rectifier 12 through a fuse 28 and an inductor 30. The junction between the voltage sources 20 and 22 is coupled to the junction between the controlled rectifiers 10 and 12 through a capacitor 32. A load 34 is coupled in parallel with the capacitor 32.

To control the operation of the inverter, a potentiometer 36 is provided which is coupled between a source of power B+ and ground. The wiper arm of the potentiometer 36 is coupled to the input of a voltage controlled oscillator 38 through a resistor 40. The frequency of oscillation of the voltage controlled oscillator 38 is determined by the magnitude of the voltage applied to the input thereof. The output of the voltage controlled oscillator 38 is coupled to the trigger input of a flip-flop 42 having Q and $\bar{Q}$ outputs.

Except as will hereinafter be described, the Q output of the flip-flop 42 is coupled to a gate pulse generator 44 through an inhibit circuit 46 and the $\bar{Q}$ output of the flip-flop 42 is coupled to a gate pulse generator 48 through the inhibit circuit 46. The output of the gate pulse generator 44 is coupled to the gate electrode of the controlled rectifier 10 and the gate pulse generator 48 is coupled to the gate electrode of the controlled rectifier 12.

Except during frequency limiting of the inverter as will be described, the frequency of oscillation of the voltage controlled oscillator 38 is controlled by the magnitude of the signal applied thereto from the potentiometer 36. The flip-flop 42 is triggered by each cycle of the output of the voltage controlled oscillator 38 to generate the Q and $\bar{Q}$ signals having a frequency determined by the frequency of the output of the voltage controlled oscillator 38. During normal operation of the inverter, the gate pulse generator 44 is responsive to the Q output of the flip-flop 42 to generate a pulse when this output shifts from a logic "0" to a logic "1" to gate the controlled rectifier 10 into conduction and the gate pulse generator 48 is responsive to the $\bar{Q}$ output of the flip-flop 42 to generate a pulse when this output shifts from a logic "0" to a logic "1" to gate the controlled rectifier 12 into conduction.

The operation of the sine wave inverter illustrated in FIG. 1 is well known. Upon the gating of one of the controlled rectifiers into conduction, for example, controlled rectifier 10, the capacitor 32 is charged therethrough from the voltage source 20. The capacitor 32 then discharges, returning current to the voltage source 20 through the antiparallel diode 14. During the time duration that the current is returned to the voltage source 20 through the antiparallel diode 14, turn-off-time is presented to the controlled rectifier 10 which is reversed biased during this time period. The operation is identical for the controlled rectifier 12 which is commutated off by current returned to the power source 22 through the antiparallel diode 16. Generally speaking, the frequency limitation of the sine wave inverter is limited by the time required for the capacitor 32 to charge and then discahrge through one of the antiparallel diodes 14 and 16 this time being determined by the capacitor 32, the inductors 26 and 30 and the load 34 and further by the minimum turn-off time which must be presetned to the controlled rectifiers 10 and 12.

As can be seen from the inverter of FIG. 1, a short circuit across the DC power supply 18 will occur if the controlled rectifiers 10 and 12 are both simultaneously conducting. This fault could occur, for example, if the inverter is operated at a frequency greater than the frequency limitation as previously described, the current pulse through the antiparallel diodes 14 and 16 presents an insufficient turn-off time to the respective controlled rectifier 10 or 12, or if one of the controlled rectifiers 10 or 12 fails to forward block as a result of being defective or as a result of an excessive rate of change of voltage thereacross.

To prevent short circuit of the DC power source 18, the inhibit circuit 46 functions in response to the currents through the antiparallel diodes 14 and 16, hereinafter referred to as $i_{14}$ and $i_{16}$, respectively, and the voltages across the controlled rectifiers 10 and 12, hereinafter referred to as $e_{10}$ and $e_{12}$, respectively, to inhibit or block the Q and $\overline{Q}$ outputs of the flip-flop 42 if the gating on of the nonconducting controlled rectifier 10 or 12 would create such a short circuit.

Information relating to the currents $i_{14}$ and $i_{16}$ through the antiparallel diodes 14 and 16 is provided to the inhibit circuit 46 by a current sensor 50. The current sensor 50 senses this current and generates a logic signal D which is a logic "1" when current is sensed. The logic signal D is supplied to the inhibit circuit 46.

A voltage sensor 52 monitors the voltage $e_{10}$ across the controlled rectifier 10 and generates a logic signal $S_{10}$ which is a logic "1" when the controlled rectifier 10 is forward blocking. A voltage sensor 54 monitors the voltage across the controlled rectifier 12 and generates a logic signal $S_{12}$ which is a logic "1" when the controlled rectifier 12 is forward blocking. The logic signals $S_{10}$ and $S_{12}$ are coupled to the inhibit circuit 46.

The inhibit circuit 46 is responsive to the logic signals D, $S_{10}$ and $S_{12}$ to generate an inhibit logic signal I which prevents the Q and $\overline{Q}$ outputs of the flip-flop 42 from passing to the respective gate pulse generators 44 and 48 when a condition is detected whereby a short circuit of the DC power source 18 can occur if the nonconducting controlled rectifier 10 or 12 is gated conductive.

In the derivation of the inhibit logic signal I, the following summarized logic signals are used:
$S_{10}$ = logic "1" if $e_{10} > 0$, otherwise $S_{10}$ = logic "0";
$S_{12}$ = logic "1" if $e_{12} > 0$, otherwise $S_{12}$ = logic "0";
D = logic "1" if $i_{14}$ or $i_{16} > 0$, otherwise D = logic "0";

Q = logic "1" if $S_{10}$ is to be gated;
$\overline{Q}$ = logic "1" if $S_{12}$ is to be gated;
I = logic "1" for inhibit;
and $\overline{I}$ = logic "1" for a safe-to-gate condition.

The controlled rectifier 10 can be safely gated conductive if the controlled rectifier 12 has been reverse biased by the current $i_{16}$ in the antiparallel diode 16 for a time equal to or greater than the specified controlled rectifier turn-off time or if the controlled rectifier 12 is forward blocking. A similar statement can be made for the off-state conditions of controlled rectifier 10 when controlled rectifier 12 is to be gated. At low operating frequencies, the inhibit logic signal I can be generated solely by monitoring the voltages $e_{10}$ and $e_{12}$ across the controlled rectifiers 10 and 12. At these low frequencies, $\overline{I}$ is a logic "1" if $\overline{Q}S_{10}$ is a logic "1," since when $\overline{Q}$ is a logic "1" controlled rectifier 12 is to be gated and when $S_{10}$ is a logic "1," the controlled rectifier 10 is forward blocking and $\overline{I}$ is a logic "1" if $QS_{12}$ is a logic "1," since when Q is a logic "1" controlled rectifier 10 is to be gated and when $S_{12}$ is a logic "1," the controlled rectifier 12 is forward blocking. From the foregoing, the equation for the safe-to-gate signal is $$\overline{I} = \overline{Q}S_{10} + QS_{12}$$

(1)

so that at low operating frequencies the inhibit signal is $$I = \overline{\overline{Q}S_{10} + QS_{12}}$$

(2)

Although this equation for the inhibit signal I is satisfactory at low operating frequencies, when the inverter is operated at higher frequencies, one of the controlled rectifiers 10 or 12 may be gated conductive while current is flowing through the antiparallel diode 14 or 16 of the other one of the controlled rectifiers 10 or 12. At these operating frequencies, where antiparallel diode and controlled rectifier conduction overlap, the aforementioned criteria for generating an inhibit signal as defined in Equation 2 is insufficient. Since it is safe to gate one of the controlled rectifiers 10 or 12 while the other one is reverse biased by current through its antiparallel diode 14 or 16, the equation for the safe-to-gate signal may be modified to include this condition and is $$\overline{I} = D + \overline{Q}S_{10} + QS_{12}$$

(3)

so that $$I = \overline{D + \overline{Q}S_{10} + QS_{12}}$$

(4)

Since the controlled rectifiers 10 and 12 require a minimum turn-off time, at the operating frequencies where antiparallel diode and controlled rectifier conduction overlap, the nonconductive controlled rectifier 10 or 12 may be gated conductive only if the turn-off time to the other one of the controlled rectifiers 10 or 12 exceeds a predetermined minimum as monitored by the duration of the current pulse through its respective antiparallel diode 14 or 16. At the high operating frequencies, the inhibit circuit 46 assures that the minimum turn-off time has been presented to the controlled rectifiers 10 and 12 by blanking the logic signal D supplied thereto from the current sensor 50 by a logic pulse B which is initiated by the leading edge of each of the D logic signals. The duration of the logic pulse B is equal to the specified controlled rectifier turn-off time plus a safety margin. The resulting blanked diode current logic signal can be expressed by the equation:

$$D_B = D\overline{B} \tag{5}$$

From the foregoing, the inhibit signal then becomes $$I = \overline{\overline{D_B} + \overline{QS_{10}} + QS_{12}} \tag{6}$$

Although the inhibit signal I can be used directly to block controlled rectifier gate signals in the event of an unsafe gating condition, this approach when applied to some forms of inverters may result in unstable operation. This problem is avoided by using the inhibit signal I to generate a blocking signal $I_B$ which has a fixed time duration. This blocking signal $I_B$ is then used to prevent the generation of further gate pulses by the gate pulse generators 44 and 48 until the expiration of the blocking signal $I_B$.

Figure 2:
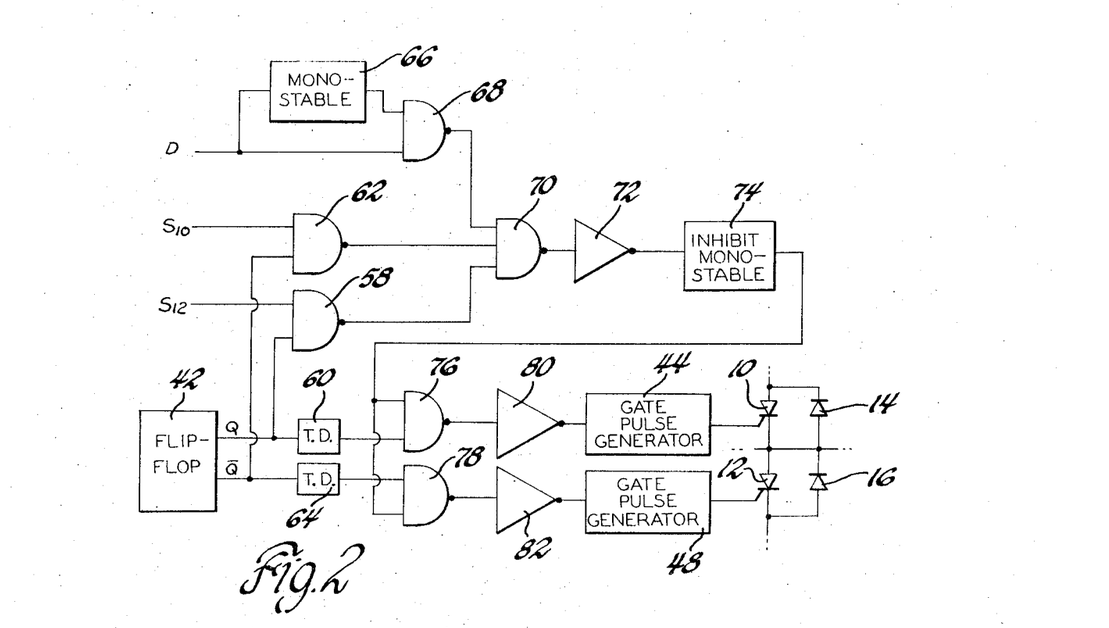
FIG. 2 is a drawing of the inhibit circuit of FIG. 1.

The inhibit circuit 46 is illustrated in FIG. 2. As illustrated therein, the Q output of the flip-flop 42 is coupled to one input of a NAND gate 58 and to the input of a time delay circuit 60. The $\overline{Q}$ output of the flip-flop 42 is coupled to one input of a NAND gate 62 and to the input of a time delay circuit 64. The logic signal D is coupled to the input of a monostable 66 and to one input of a NAND gate 68. The monostable 66 is triggered when the logic signal D shifts to a logic "1." The output of the monostable 66 is the inverse of the logic signal B and is coupled to a second input of the NAND gate 68. The logic signal $S_{10}$ is coupled to a second input of the NAND gate 62 and the logic signal $S_{12}$ is coupled to a second input of the NAND gate 58. The outputs of the NAND gates 58, 62 and 68 are the logic signals $\overline{QS_{12}}$, $\overline{QS_{10}}$ and $\overline{D_B}$, respectively, which are coupled to respective inputs of a NAND gate 70. The output of the NAND gate 70 is inverted by an inverter 72 whose output is the inhibit signal $I = \overline{\overline{D_B} + \overline{QS_{10}} + QS_{12}}$ which is coupled to an inhibit monostable 74. The output of the monostable 74 is the blocking signal $I_B$ which is a logic "0" for the fixed time duration after the inhibit signal I shifts to a logic "1." The output of each of the time delay circuits 60 and 64 are coupled to respective inputs of a pair of NAND gates 76 and 78 whose outputs are inverted by respective inverters 80 and 82. The outputs of the inverters 80 and 82 are coupled to the gate pulse generators 44 and 48. The output of the inhibit monostable 74 is coupled to respective second inputs of the NAND gates 76 and 78. The outputs of the inverters 80 and 82 are the logic signals $QI_B$ and $\overline{QI_B}$, respectively. Therefore, while the blocking signal $I_B$ is a logic "1," the outputs of the inverters 80 and 82 are each maintained at a logic "0" and the Q and $\overline{Q}$ outputs of the flip-flop 42 are ineffective for gating the controlled rectifiers 10 and 12 conductive. During the absence of the blocking signal $I_B$ ($\overline{I_B}$ = logic "1"), the outputs of the inverters 80 and 82 are substantially the Q and $\overline{Q}$ outputs of the flip-flop 42 which are effective for gating the controlled rectifiers 10 and 12 conductive. The delay time of each of the time delay circuits 60 and 64 is at least greater than the sum of the delay times through the NAND gate 70, the inverter 72, the monostable 74 and the NAND gate 58 or the NAND gate 62 so as to prevent a "race" condition between the Q and $\overline{Q}$ outputs of the flip-flop 42 and the blocking signal $I_B$.

Figure 3:
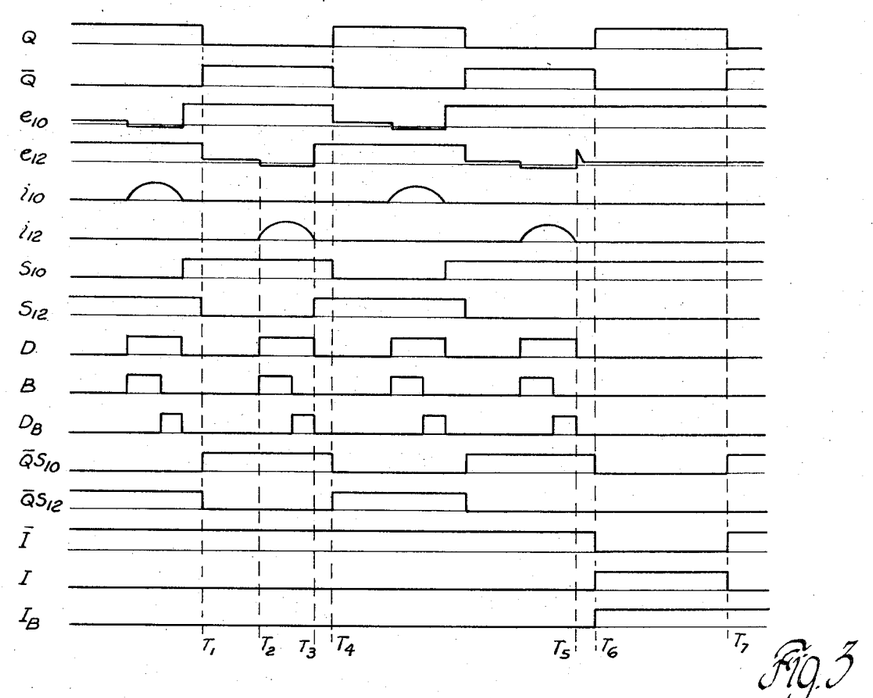
FIG. 3 is a timing diagram for the system illustrated in FIG. 1 applicable when one of the controlled rectifiers of the inverter fails to forward block.

Referring to the timing diagram of FIG. 3, at a time just prior to $T_1$, each of the controlled rectifiers 10 and 12 are forward blocking as the logic signals $S_{10}$ and $S_{12}$ from the voltage sensors 52 and 54 are each logic "1." At time $T_1$, the $\overline{Q}$ output of the flip-flop 42 shifts from logic "0" to logic "1" resulting in the logic signal $\overline{QS_{10}}$ shifting from logic "0" to logic "1." Consequently, I representing a safe-to-gate condition for controlled rectifier 12 is a logic "1." After the delay time of the time delay circuit 64, the output of the NAND gate 78 shifts to a logic "0" and the output of the inverter 82 shifts to a logic "1." The gate pulse generator is responsive thereto for gating the controlled rectifier 12 into conduction. At time $T_2$, the current $i_{16}$ begins to flow through the antiparallel diode 16 to reverse bias the controlled rectifier 12. At time $T_3$, current $i_{16}$ through the antiparallel diode 16 ceases and the controlled rectifier 12 again forward blocks as represented by the shifting of the logic signal $S_{12}$ from logic "0" to logic "1." At time $T_4$, the Q output of the flip-flop 42 shifts from logic "0" to logic "1" to initiate the gating of the controlled rectifier 10 into conduction. As at this time the controlled rectifier 12 is forward blocking, the logic signal $QS_{12}$ shifts from logic "0" to logic "1." Therefore, the safe-to-gate signal I is maintained at logic "1" and the controlled rectifier 10 is gated conductive.

The aforementioned cycle repeats until at time $T_5$ the controlled rectifier 12 fails to forward block at the end of the current pulse $i_{16}$ through the antiparallel diode 16. Thereafter, at time $T_6$ when the Q output of the flip-flop 42 shifts from logic "0" to logic signal $QS_{12}$ remains at logic "0." Consequently, the inhibit signal I is generated at the output of the inverter 72 to trigger the inhibit monostable 74 which generates the blocking signal $I_B$ to inhibit the gating of the controlled rectifiers 10 and 12. The gating of the controlled rectifiers 10 and 12 is inhibited for the duration of the blocking signal $I_B$ even though at time $T_7$ the inhibit signal I shifts to logic "0." If the inverter has recovered when the blocking signal terminates, it will then continue to function in the normal manner. If the inverter has not recovered, the blocking signal $I_B$ will again be generated when the inhibit signal I shifts to logic "1" as the $\overline{Q}$ output of the flip-flop 42 shifts to logic "1."

Figure 4:
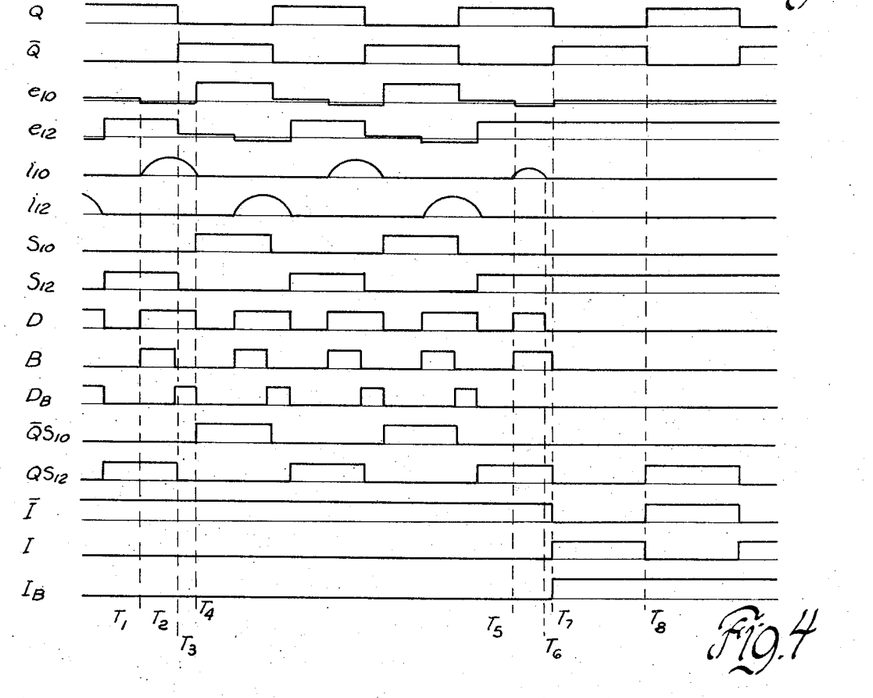
FIG. 4 is a timing diagram for the system of FIG. 1 applicable when the time duration of the current pulse through the antiparallel diode of one of the controlled rectifiers is insufficient.
Figure 5:
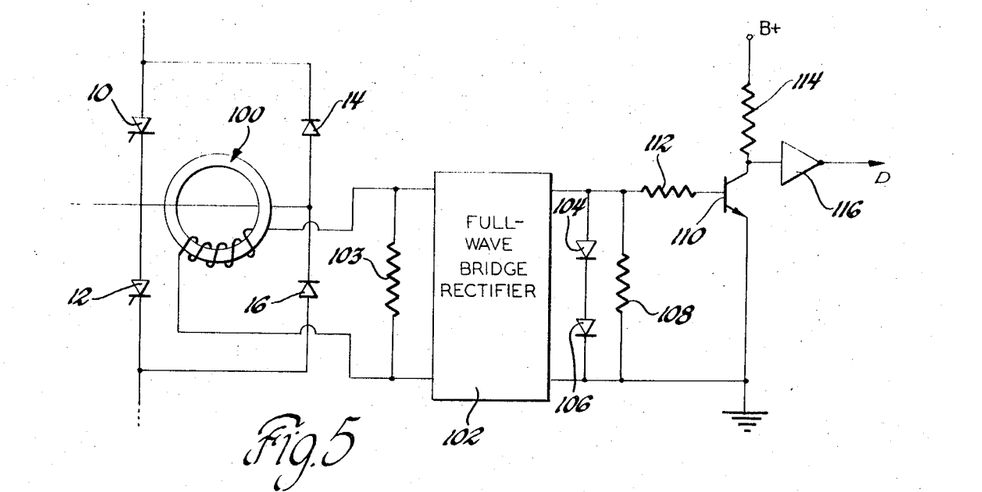
FIG. 5 is a diagram illustrating the current sensor used in the preferred embodiment of this invention.

Referring to FIG. 4, there is illustrated a timing diagram for the inverter when operating at a frequency wherein a signal is generated to gate one of the controlled rectifiers 10 or 12 conductive while the other one of the controlled rectifiers 10 or 12 is reverse biased by current through its respective antiparallel diode 14 or 16. As seen in FIG. 5, at time $T_1$ the controlled rectifier 12 is forward blocking and current $i_{14}$ begins to flow through the antiparallel diode 14 to reverse bias the controlled rectifier 10. At time $T_2$, the duration of the current $i_{14}$ exceeds the minimum turn-off time as represented by the duration of the logic signal B. The logic signal $D_B$ then shifts from logic "0" to logic "1." At time $T_3$, the $\overline{Q}$ output of the flip-flop 42 shifts from logic "0" to logic "1" to initiate the gating of the controlled rectifier 12 into conduction. Even though at time $T_3$ the controlled rectifier 10 is not forward blocking, the minimum turn-off time has been presented thereto as represetned by the generation of the logic signal $D_B$. From time $T_1$ through $T_3$, $QS_{12} + D_B$ is a continuous logic "1." Therefore, the inhibit signal I is not generated and the controlled rectifier 12 is gated into conduction. At time $T_4$, the current $i_{14}$ goes to zero and the controlled rectifier 10 forward blocks resulting in the generation of the logic signal $\overline{QS}_1$ which prevents the generation of the inhibit signal I. In this manner, at all times during normal operation, either the signal $D_B$, $\overline{QS}_{10}$ or $QS_{12}$ is a logic "1" to prevent the generation of the inhibit signal I.

At time $T_5$, current $i_{14}$ begins to flow through the antiparallel diode 14 and reverse biases the controlled rectifier 10. The current $i_{14}$ continues until time $T_6$ with a time duration less than the minimum specified time duration as represented by the logic signal B. As the turn-off time presented to the controlled rectifier 10 from $T_5$ to $T_6$ is insufficient, it fails to forward block upon the termination of the current $i_{14}$ through the antiparallel diode 14. Thereafter at time $T_7$ when the $\overline{Q}$ output of the flip-flop 42 shifts from logic "0" to logic "1" and the logic signal $QS_{12}$ shifts from logic "1" to logic "0," the inhibit signal I is generated at the output of the inverter 72 to trigger the inhibit monostable 74. The resulting blocking signal $I_B$ inhibits the NAND gates 76 and 78 to prevent the gating of the controlled rectifier 12 conductive for the duration of the blocking signal $I_B$ even though the inhibit signal I shifts to logic "0" at time $T_8$. If the inverter has recovered after the time duration of the blocking signal $I_B$ at the output of the inhibit monostable 74, it will then continue to operate in the normal manner. If it has failed to recover, the inhibit signal I will again be generated in the manner described to trigger the inhibit monostable 74.

As seen in FIG. 4, if the frequency of the inverter were increased by increasing the voltage input to the voltage controlled oscillator 38 from the potentiometer 36, the Q or $\overline{Q}$ outputs of the flip-flop 42 would change states before the minimum specified turn-off time has been presented to the conducting controlled rectifier 10 or 12 by current through its respective antiparallel diode 14 or 16. Consequently, at this operating frequency an oscillating inhibit signal I would be generated which would periodically trigger the inhibit monostable 74. The resulting blocking signal would inhibit further triggering of either of the controlled rectifiers 10 or 12 for its time duration. The inhibit signal I resulting from the operation of the inverter at the aforementioned increased frequency is used in the present invention to limit the upper operating frequency of the inverter to a fraction, less than unity, of the resonant frequency of the circuit including the capacitor 32, inductors 26 and 30 and the load 34. This is accomplished by a frequency limiting circuit 84 illustrated in FIG. 1.

As seen in FIG. 1, the frequency limiting circuit 84 includes an NPN transistor 86 having its emitter coupled to ground and its collector coupled to the voltage source B+ through a light emitting diode 88 and a resistor 90. An NPN transistor 92 has its emitter coupled to the base electrode of the transistor 86 and its collector coupled to the input of the voltage controlled oscillator 92. The base of the transistor 92 is coupled to ground through an integrator comprised of the parallel combination of a resistor 94 and a capacitor 96. The inhibit signal I from the inhibit circuit 46 is coupled to the base electrode of the transistor 92 through a diode 98. This signal is integrated by the integrator comprised of the capacitor 96 and the resistor 94 to produce a DC voltage at the base of the transistor 92 which is biased into conduction thereby to decrease the magnitude of the voltage input to the voltage controlled oscillator 38. This decreased voltage results in the decrease of the frequency output of the voltage controlled oscillator 38 to thereby decrease the operating frequency of the inverter. The transistor 86 amplifies the emitter current of the transistor 92 and energizes the light emitting diode 88 to provide a visual indication that the frequency limit has been reached.

Referring to FIG. 5, there is illustrated the preferred form of the current sensor 50. A current transformer 100 monitors the current through the antiparallel diodes 14 and 16 and supplies a voltage to a full-wave bridge rectifier 102 having a magnitude directly related to the current sensed. A load resistor 103 is coupled across the output of the current sensor 100. The output of the full-wave bridge rectifier 102 is coupled across a pair of series-coupled diodes 104 and 106 and a resistor 108. The diodes 104 and 106 act as a variable resistor with high resistance to give a fast rising output voltage when current is low at the beginning and end of a current pulse and with low resistance when current in the transformer is high to minimize power loss. The output of the full-wave bridge rectifier 102 is coupled to the base of an NPN transistor 110 through a resistor 112. The emitter of the transistor 110 is grounded and the collector thereof is coupled to the source B+ through a resistor 114. The collector of the transistor 110 is further coupled to the input of an inverter 116 whose output is the current logic signal D.

Figure 6:
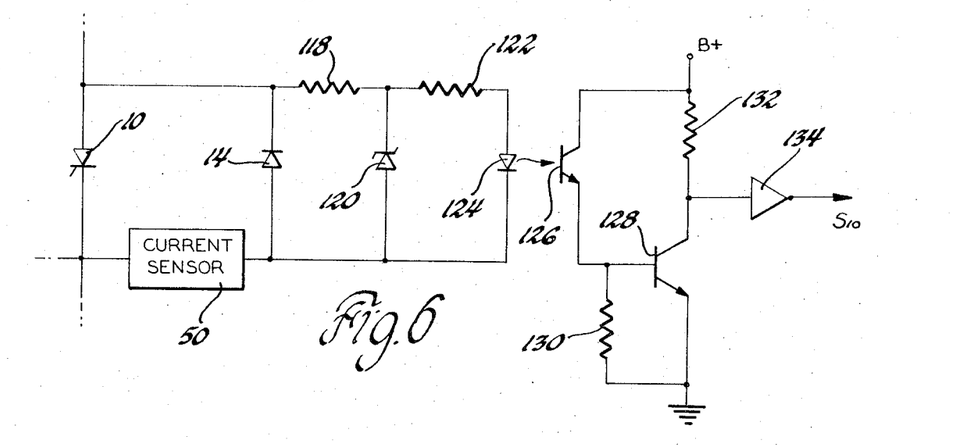
FIG. 6 is a diagram of the voltage sensor used in the preferred embodiment of this invention.

Referring to FIG. 6, there is illustrated a preferred form of the voltage sensors 52 and 54. The voltage sensor 52 only is illustrated, it being understood that the voltage sensor 54 is identical thereto. The voltage sensor 52 includes a resistor 118 series-coupled with a Zener diode 120 across the controlled rectifier 10. The resistor 118 and the Zener diode 120 normalize the voltage across the controlled rectifier 10. A current limiting resistor 122 is series-coupled with a photodiode 124 across the Zener diode 120. A phototransistor 126 is positioned to monitor the output of the photodiode 124 and has its collector coupled to the source B+ and its emitter coupled to the base of an NPN transistor 128 and to ground through a resistor 130. The emitter of the transistor 128 is grounded and the collector thereof is coupled to the source B+ through a resistor 132. The collector of the transistor 128 is further coupled to the input of an inverter 134 whose output is the logic signal $S_{10}$.

When the controlled rectifier 10 forward blocks, the voltage thereacross is applied across the resistor 118 and the Zener diode 120 to provide a regulated output to the series circuit comprised of the resistor 122 and the photodiode 124. The resulting energization of the photodiode 124 is sensed by the phototransistor 126.

The phototransistor 126 conducts to bias the transistor 128 into conduction which grounds the input to the inverter 134. The output of the inverter 134 comprising the logic signal $S_{10}$ then shifts to logic "1" representing that the controlled rectifier 10 is forward bocking. In the same manner, the logic signal $S_{12}$ is generated in response to the voltage across the controlled rectifier 12.

Although the preferred embodiment of this invention is described with reference to a sine wave inverter, it is understood that the subject invention may be used with any inverter having controlled rectifier-antiparallel diode pairs.

The description of a preferred embodiment of this invention for the purposes of illustrating the invention is not to be considered as limiting or restricting the invention since many modifications may be made by one skilled in the art without departing from the scope of the invention.

What is claimed is:

1. A fault protection circuit for an inverter, the inverter including first and second series coupled controlled rectifiers each having a respective oppositely poled diode coupled in parallel therewith and including at least one resonant circuit for commutating each of the controlled rectifiers by driving current through the diode parallel coupled therewith, the fault protection circuit comprising: means for generating alternating timing logic signals Q and $\overline{Q}$; the timing logic signal $\overline{Q}$ representing the time period during which the first controlled rectifier may conduct and the timing logic signal Q representing the time period during which the second controlled rectifier may conduct; means for sensing current through the diodes and generating a current logic signal D coexistent with sensed current; first voltage sensing means coupled to the first controlled rectifier for generating a voltage logic signal $S_1$ when the first controlled rectifier is forward blocking; second voltage sensing means coupled to the second controlled rectifier for generating a voltage logic signal $S_2$ when the second controlled rectifier is forward blocking; means responsive to the timing logic signals Q and $\overline{Q}$, the current logic signal D and the voltage logic signals $S_1$ and $S_2$ for generating an inhibit logic signal I defined by the equation $$I = \overline{D + \overline{Q}S_1 + QS_2};$$

(1)

and gating means responsive to the inhibit logic signal I and the timing signals Q and $\overline{Q}$ for gating the first controlled rectifier conductive upon the occurrence of a condition defined by the expression $$Q\overline{I}$$

(2)

and gating the second controlled rectifier conductive upon the occurrence of a condition defined by the expression $$\overline{Q}\,\overline{I},$$

(3)

whereby the inhibit logic signal I is generated to prevent a short circuit fault across the first and second controlled rectifiers.

2. A fault protection circuit for an inverter, the inverter including first and second series coupled controlled rectifiers each having a respective oppositely poled diode coupled in parallel therewith and including at least one resonant circuit for commutating each of the controlled rectifiers by driving current through the diode parallel coupled therewith, the fault protection circuit comprising: means for generating variable frequency alternating timing logic signals Q and $\overline{Q}$, the timing logic signal Q representing the time period during which the first controlled rectifier may conduct, the timing logic signal $\overline{Q}$ representing the time period during which the second controlled rectifier may conduct and the frequency of the timing logic signals being equal to a desired operating frequency of the inverter; means for sensing current through the diodes and generating a current logic signal D coexistent with sensed current; first voltage sensing means coupled to the first controlled rectifier for generating a voltage logic signal $S_1$ when the first controlled rectifier is forward blocking; second voltage sensing means coupled to the second controlled rectifier for generating a voltage logic signal $S_2$ when the second controlled rectifier is forward blocking; means responsive to the timing logic signals Q and $\overline{Q}$, the current logic signal D and the voltage logic signals $S_1$ and $S_2$ for generating an inhibit logic signal I defined by the equation $$I = \overline{D + \overline{Q}S_1 + QS_2};$$

(1)

means responsive to the generation of the inhibit logic signal I for generating a blocking signal $I_B$ having a specified time duration: and gating means responsive to the blocking signal $I_B$ and the timing signals Q and $\overline{Q}$ for gating the first controlled rectifier conductive upon the occurrence of a condition defined by the expression $$Q\,\overline{I}_B$$

(2)

and gating the second controlled rectifier conductive upon the occurrence of a condition defined by the expression $$\overline{Q}\,\overline{I}_B,$$

(3)

whereby the blocking signal $I_B$ is generated to prevent a short circuit fault across the first and second controlled rectifiers.

3. A fault protection circuit for an inverter, the inverter including first and second series coupled controlled rectifiers each having a respective oppositely poled diode coupled in parallel therewith and including at least one resonant circuit for commutating each of the controlled rectifiers by driving current thorugh the diode parallel coupled therewith, the fault protection circuit comprising: means for generating a frequency control voltage; a voltage controlled oscillator coupled to the last mentioned means for generating an output signal having a frequency determined by the magnitude of the frequency control voltage; means coupled to the voltage controlled oscillator for generating alternating timing logic signals Q and $\overline{Q}$ at a frequency determined by the frequency of the output signal from the voltage controlled oscillator, the timing logic signal Q representing the time period during which the first controlled rectifier may conduct and the timing logic signal $\bar{Q}$ representing the time period during which the second controlled rectifier may conduct; means for sensing current through the diodes and generating a current logic signal D coexistent with sensed current; first voltage sensing means cupled to the first controlled rectifier for generating a voltage logic signal $S_1$ when the first controlled rectifier is forward blocking; second voltage sensing means coupled to the second controlled rectifier for generating a voltage logic signal $S_2$ when the second controlled rectifier is forward blocking; means responsive to the timing logic signals Q and $\bar{Q}$, the current logic signal D and the voltage logic signals $S_1$ and $S_2$ for generating an inhibit logic signal I defined by the equation $$I = \overline{D + \bar{Q}S_1 + QS_2};$$

(1)

gating means responsive to the inhibit logic signal I and the timing signals Q and $\bar{Q}$ for gating the first controlled rectifier conductive upon the occurrence of a condition defined by the expression $$Q\bar{I}$$

(2)

and gating the second controlled rectifier conductive upon the occurrence of a condition defined by the expression $$\bar{Q}\bar{I};$$

(3)

and frequency limiting means coupled to the voltage controlled oscillator and responsive to the generation of the inhibit logic signal I for limiting the frequency of the output signal from the voltage controlled oscillator, whereby the inhibit logic signal I is generated to prevent a short circuit fault across the first and second controlled rectifiers and for limiting the frequency of operation of the inverter.

* * * * *

PO-1050
(5/69)

UNITED STATES PATENT OFFICE
CERTIFICATE OF CORRECTION

Patent No. 3,852,656        Dated December 3, 1974

Inventor(s) Frank J. Bourbeau

It is certified that error appears in the above-identified patent and that said Letters Patent are hereby corrected as shown below:

Column 3, line 19, "discahrge" should be -- discharge --.
Column 6, line 45, "logic '0' to logic signal $QS_{12}$" should read -- logic "0" to logic "1", the logic signal $QS_{12}$ --.
Column 7, line 10, "represetned" should be -- represented --.
Column 9, line 5, "bocking" should be -- blocking --; line 29, "$\bar{Q}$" should be -- Q --; line 32, "Q" should be -- $\bar{Q}$ --.
Column 10, line 58, "thorugh" should be -- through --.
Column 11, line 8, "cupled" should be -- coupled --.

Signed and sealed this 18th day of March 1975.

(SEAL)
Attest:

RUTH C. MASON
Attesting Officer

C. MARSHALL DANN
Commissioner of Patents
and Trademarks